C. GRESIUCHNA & L. JARCHOW.
APPARATUS FOR RECTIFYING DISTILLED LIQUIDS.
No. 66,323.    Patented July 2, 1867.
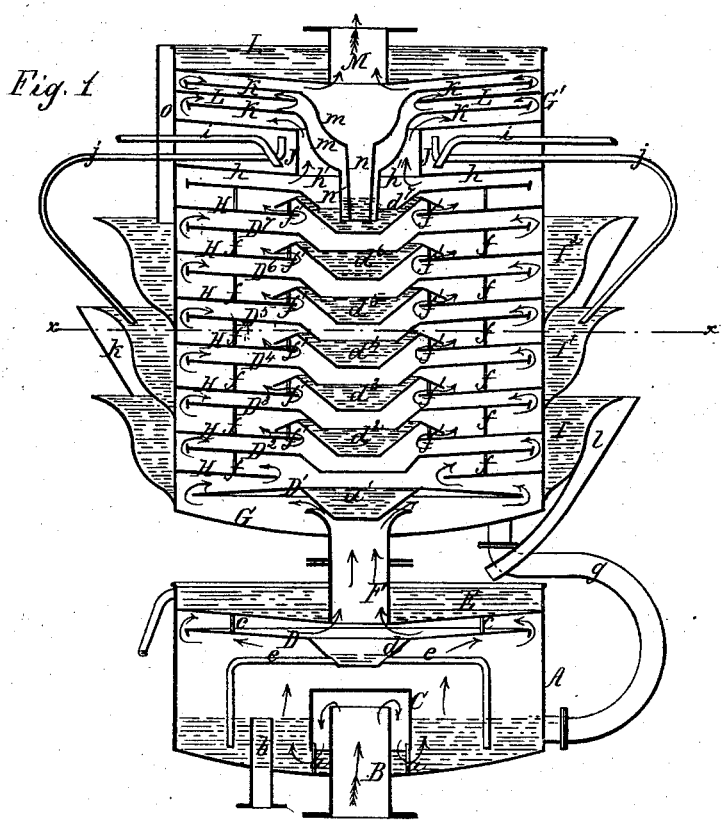
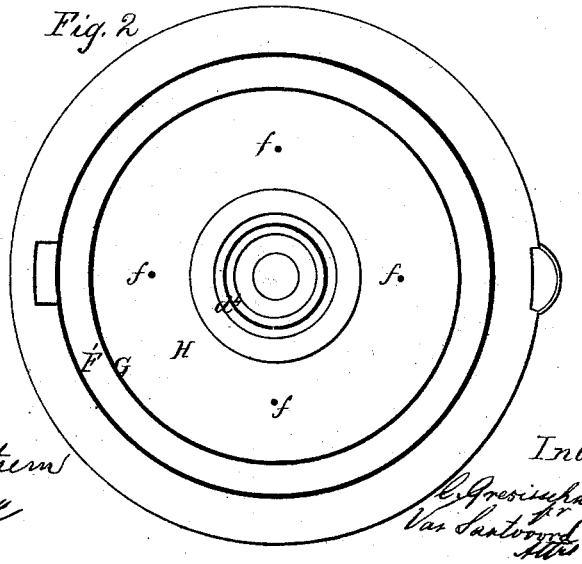
Witnesses
Geo. F Southern
Gustav Berg
Inventors

United States Patent Office.

C. GRESIUCHNA AND L. JARCHOW, OF NEW YORK, N. Y.

Letters Patent No. 66,323, dated July 2, 1867.

---

IMPROVED APPARATUS FOR RECTIFYING DISTILLED LIQUIDS.

---

The Schedule referred to in these Letters Patent and making part of the same.

---

TO ALL WHOM IT MAY CONCERN:

Be it known that we, C. GRESIUCHNA and L. JARCHOW, both of the city, county, and State of New York, have invented a new and improved Apparatus for Rectifying Distilled Liquors; and we do hereby declare that the following is a full, clear, and exact description thereof, which will enable those skilled in the art to make and use the same, reference being had to the accompanying drawing, forming part of this specification, in which drawing—

Figure 1 represents a vertical central section of this invention.

Figure 2 is a horizontal section of the same, the line $x\, x$, fig. 1, indicating the plane of section.

Similar letters of reference indicate corresponding parts.

This invention relates to an apparatus for rectifying distilled liquors, in which the vapors, after they leave the still, pass up through a pipe provided with a loose cap, that is open at the bottom, into a receiver, at the bottom of which collects the low wine resulting from the condensation of the heavy vapors. This receiver is provided with a central escape pipe, which connects with the rectifying-chamber above, and the lower part is surrounded by water, so that the heaviest vapors will condense and collect in the form of liquid at the bottom of the receiver. A circular dish with a central depression prevents the vapors from passing up through the discharge pipe in a direct course, and causes the same to come in contact with the inner surface of the top of the receiver, which is kept cool by the water above; and the liquid resulting from the condensation of a portion of the vapors collects in the central depression of the dish, whence it runs down through suitable pipes into the receiver. The rectifying-chamber is also provided with a series of dishes, shelves, and cups, so that the vapors rising up into the same are compelled to travel through it in an indirect course, and the liquid resulting from the condensation of a portion of said vapors collects in the cups, from which it overflows and passes down through a suitable pipe into the receiver. The condensation of the vapors in the rectifying-chamber is facilitated by water-jackets surrounding said chamber, and by a water-chamber on its top, which connects, by a suitable pipe or pipes, with a supply-tank, and by another pipe or pipes with one of the water-jackets below, so that the temperature of the water in said jackets gradually increases towards the bottom of the rectifying-chamber. The vapors which have not condensed in the rectifying-chamber pass up into an additional chamber provided with shelves and dishes, and surmounted by a vessel supplied with cold water, so that a final condensation takes place of a portion of the vapors, and that only the light or alcoholic vapors are permitted to escape from the rectifying apparatus to the cooler.

A represents the receiver, which communicates by the pipe B with the still. This pipe extends up through the bottom of the receiver, and its inner end is covered by a cap, C, which fits loosely over it, and which is open at the bottom, being supported by suitable legs or strips $a$, so that the vapors rising through the pipe B are compelled by the cap to turn down in order to escape at the bottom edge of said cap. In passing down through the cap and up again, after having escaped from the same, the vapors are compelled to travel through the low wine which accumulates at the bottom of the receiver, and the depth of which in the receiver is determined by the overflow pipe $b$, which may be made to connect with the still or with any other suitable vessel. As the vapors rise in the receiver they strike the under surface of the circular dish D, the diameter of which is somewhat less than the inner diameter of the receiver, so as to permit the vapors to pass up through the annular space between the dish and the receiver, as indicated by arrows in fig. 1 of the drawing. The dish D is suspended from the top plate of the receiver by pins or studs $c$, and it is provided with a central depression, $d$, intended to receive the low wine resulting from the condensation of a portion of the vapors during their passage through the space between the dish and the top plate of the receiver. From the bottom part of the depression $d$ extend two (more or less) pipes $e$, through which the low wine accumulating in said depression runs down into the receiver A. The top plate of the receiver is depressed towards its centre, and the edges of the receiver project above said top plate, so as to form a vessel, E, capable of holding a quantity of water, whereby the condensation of a portion of the vapors coming in contact with the top plate of the receiver is facilitated. The water in the vessel E is supplied from above, as will be hereinafter described, and the surplus water passes off through a suitable waste pipe. From the centre of the top plate of the receiver rises a pipe, F, through which the vapors pass up into the rectifier G. This rectifier is provided with a series of circular dishes, $D^1$ $D^2$ $D^3$, etc., similar to the dish D in the rectifier, with that exception, that their central depressions are open at the bottom, and that over each of said central depressions a cup, $d^1$ $d^2$ $d^3$, etc., is secured, as shown in the drawing. These cups rest upon pins or studs $f'$ rising from circular shelves H which are attached to the interior of the rectifier, and which are depressed towards their centres, where they are provided with apertures for the upward passage of the vapors and for the downward passage of the low wine resulting from the condensation of a portion of said vapors. The low wine, dripping down over the dishes $D^1$ $D^2$ $D^3$, etc., and over shelves H, collects in the cups $d^1$ $d^2$ $d^3$, etc., and if these cups are full it overflows, and finally passes down through the pipe $g$ into the receiver A. The rectifier is provided with three (more or less) water-jackets I $I^1$ $I^2$, which are filled with water, so as to promote the condensation of a portion of the vapors passing up through the rectifier. The manner in which the water-jackets are supplied with water will be presently explained. The top plate $h$ of the receiver G is perforated in its centre with a circular aperture, $h'$, through which the vapors pass up into the additional rectifier G'. The bottom part of this additional rectifier is occupied by a water-chamber, J, which is supplied with water through one or more pipes $i$, and from which the surplus water passes off through overflow pipes $j$. These overflow pipes lead down to the second water-jacket $I^1$, which is provided with an overflow channel, $k$, through which the water passes down into the jacket I; and if this jacket is full, the water flows through the overflow pipe $l$ into the vessel E on the top of the receiver A. By these means the water, which is admitted cold into the chamber J, is gradually warmed as it passes down through the jackets $I^1$ I and the vessel E, and its cooling effect is proportionately diminished, so that the heaviest vapors will condense below, and as the remaining vapors rise the condensation extends gradually to lighter vapors. Above the water-chamber J, in the additional rectifier G', are two or more dishes K, with an intervening shelf, L, and each of the dishes is provided with a central depression, $m$, from which descends a tube, $n$, so that the low wine, which results from the condensation of a portion of the vapors passing through the additional rectifier, drops down over the dishes K, and through the depressions $m$ and tubes $n$, into the upper cup $d^1$ in the rectifier G. On the top of the additional rectifier G' is a water-vessel, L, which is supplied with cold water from a suitable reservoir, and from which the water overflows through a channel, $o$, which leads down into the upper water-jacket of the rectifier G. The light vapors which will not condense in the rectifiers G G' pass off through the pipe M, which connects with a cooler or condenser of any suitable construction.

By this apparatus the low wine or heavy liquid can be readily separated from the alcoholic or light vapors, and the rectification of spirituous or other distilled liquors can be carried on with ease and facility.

What we claim as new, and desire to secure by Letters Patent, is—

1. The arrangement of the receiver A, provided with one or more dishes D and a water-vessel, E, in combination with the rectifiers G G', provided with dishes $D^1$ $D^2$ $D^3$ $D^7$ K, water-jackets I $I^1$ $I^2$, water-vessel L, and suitable connecting pipes, all substantially as shown and described.

2. The arrangement of cups $d^1$ $d^2$ $d^3 d^7$ in combination with the dishes $D^1$ $D^2$ $D^3$ $D^7$ and shelves H in the rectifier G, substantially as and for the purpose set forth.

3. The arrangement of dishes K with depressions $m$ and descending tubes $n$ in the interior of the rectifier G', in combination with the cup $d^7$ in the rectifier G, constructed and operating substantially as and for the purpose described.

C. GRESIUCHNA,
L. JARCHOW.

Witnesses:
AMASA A. REDFIELD,
W. HAUFF.